Oct. 19, 1965  H. P. MARKANT  3,212,235
METHOD OF AND APPARATUS FOR THE RECOVERY OF HEAT
AND CHEMICALS FROM HOT DUST LADEN GAS
Original Filed Nov. 12, 1959  2 Sheets-Sheet 1

INVENTOR.
Henry P. Markant
BY
ATTORNEY

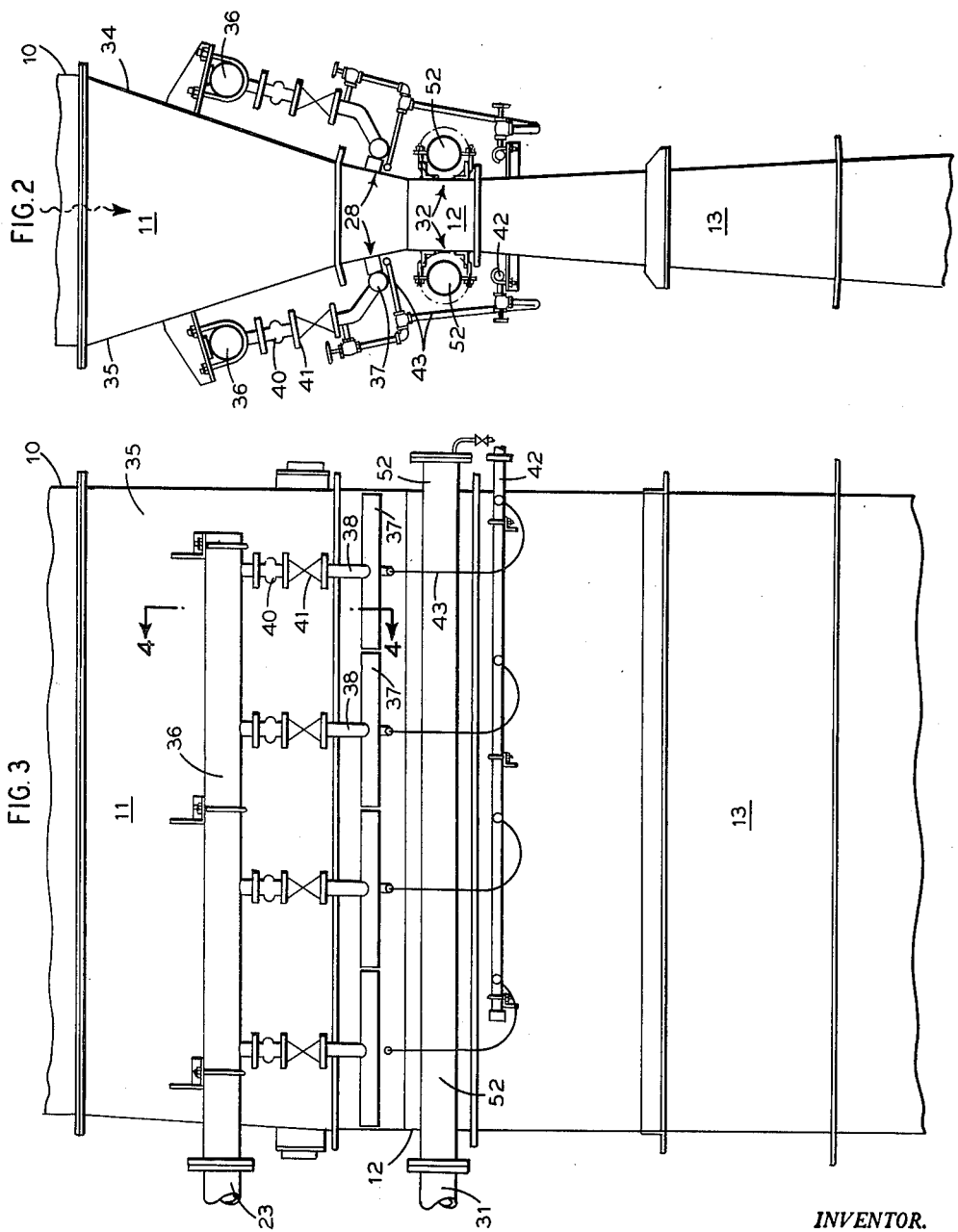

United States Patent Office 3,212,235
Patented Oct. 19, 1965

3,212,235
METHOD OF AND APPARATUS FOR THE RECOVERY OF HEAT AND CHEMICALS FROM HOT DUST LADEN GAS
Henry P. Markant, Alliance, Ohio, assignor to The Babcock & Wilcox Company, New York, N.Y., a corporation of New Jersey
Continuation of application Ser. No. 852,501, Nov. 12, 1959. This application Feb. 14, 1962, Ser. No. 174,657
5 Claims. (Cl. 55—48)

This application is a continuation of my prior application Serial No. 852,501 filed November 12, 1959, now abandoned.

This invention relates to a method of and apparatus for the recovery of heat and solids from a hot gas laden with entrained dust particles and/or chemical fume, and more particularly to a method of and apparatus for increasing dust removal efficiency without increasing the power requirements for such recovery.

In many industrial processes the gases produced contain chemicals in the form of dust or fume which it is desirable to separate out to recover monetary values and/or to eliminate a dust nuisance. When the gases in addition contain heat values, it may also be of economic importance to reclaim at least some of the heat in the gases. The desirability of both heat and chemical recovery is exemplified in the pulp and paper industry applications where the effluent gases from the incineration of the pulp residual liquor from, for example, the sulphate process, contain chemical fume and heat values.

It is known that the dust or fume in gases discharged from a smelting furnace used in the chemical recovery of residual liquor, may be removed from the gases by use of a venturi scrubber-cyclone separator unit such as shown in U.S. Patent 2,879,838. It is also known that the fume may be removed from the hot gases by intimate contact between the hot gases and a sprayed liquid such as water or brine. The intimate contact is attained by the acceleration of the gases to a high velocity, such as 175 ft. per second, where the high velocity gases atomize the relatively coarse spray of the introduced liquid. When the gases contacted by the liquid are at a relatively high temperature, considerable quantities of the spray liquid will be evaporated. Under these circumstances, the liquid droplets atomized in the venturi scrubber will tend to wet and the dust particles agglomerate and absorb the fume in the gases. Thereafter, the agglomerated particles may be separated from the gases in the cyclone separator portion of the unit. It is also known that the fume may be removed from the effluent gases by the use of residual liquor as the contacting medium. Thus, under these circumstances, not only is the fume removed from the entraining gases but the residual liquor is also concentrated by the evaporation of moisture therefrom so that the liquor may thereafter be used directly in the incinerating furnace. However, the use of residual liquor as a spraying medium necessitates increasing the flow velocity and pressure drop of the gases passing through the throat of the venturi scrubber. The increased pressure drop is necessary due to the viscosities of the liquor where higher velocities are needed to suitably atomize the sprayed liquor. As a result of the use of liquor, the pressure drop of the gases passing through the throat approaches the economic limits of fans when high efficiency dust separation is desired.

In accordance with this invention, I have found that the advantageous concentration of the residual liquor and an efficient recovery of the dust in the effluent gases can be attained by the use of residual liquor of different concentrations introduced at spaced positions along the length of a venturi scrubber. With my invention, I can increase the dust collecting efficiency of a venturi scrubber without increasing the pressure drop of the gases flowing through the scrubber as compared to present practice. Conversely, I can reduce the pressure drop of the gases passing through the scrubber while maintaining the dust collecting efficiency of the unit.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 2 is an enlarged view of a portion of the venturi scrubber shown in FIG. 1;

FIG. 3 is a side elevation of the venturi scrubber throat portion shown in FIG. 2.

Figures 1, 4:
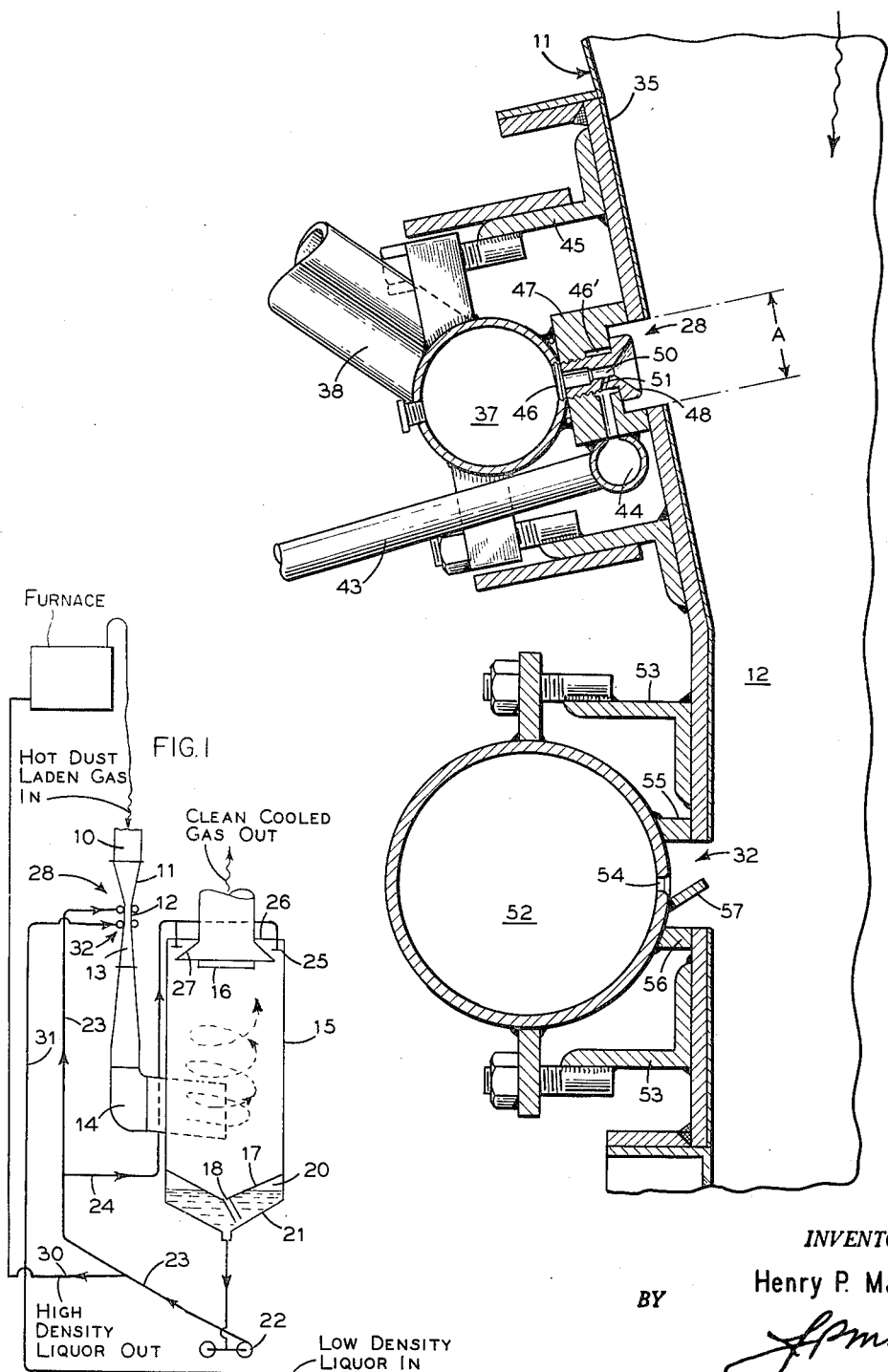
FIG. 1 is a schematic showing of a venturi scrubber-cyclone separator constructed and arranged in accordance with this invention.
FIG. 4 is an enlarged sectional view of the throat portion of the scrubber shown in FIG. 2, taken along line 4—4.

As shown in FIG. 1, a venturi scrubber-cyclone separator unit of the general type shown in U.S. Patent 2,879,838 is diagrammatically illustrated. The hot gases received from, for example, the incinerating furnace of a residual liquor recovery unit enter the venturi scrubber through a duct 10. The gases pass through a converging inlet portion 11 wherein the gases are accelerated prior to entering the throat portion 12 of the scrubber. After leaving the throat portion 12, the gases, with entrained liquids and solids, pass through a diverging portion 13, a turning duct portion 14 and tangentially enter the cyclone separator 15. Within the cyclone 15, the gases whirl in an upward direction to pass through a central gas outlet duct 16 in the upper end of the cyclone. The whirling action of the gases in passing through the cyclone causes a centrifugal separation of the entrained solid and liquid particles, with those particles striking the wall of the cyclone and discharging by gravity to an inverted frusto-conical false bottom 17 in the cyclone. The false bottom is provided with a central outlet 18 which discharges into a sump 20 formed between the frusto-conical false bottom and the lower inverted frusto-conical plate 21 of the cyclone 15.

Since the particles separated in the cyclone may have a tendency to accumulate on the interior surfaces of the cyclone, wall washing means are provided to remove the particles. As shown, residual liquor is delivered from a pump 22 through pipe 23 and branch pipe 24 to a series of nozzles 25 positioned immediately adjacent the top cover plate 26 of the cyclone separator 15. A frusto-conical shield or skirt 27 encircles the duct 16 forming the gas outlet from the separator with its lower edge portion inwardly spaced from the interior surface of the wall defining the cyclone. The nozzles 25 discharge the wall washing liquor into the annular space above the frusto-conical skirt 27 causing the liquor to move downwardly along the wall of the cyclone, with the mixture discharging to the sump 20 through the central opening 18 of the false bottom 17.

As shown in FIG. 1, the residual liquor delivered to the venturi scrubber is passed to the nozzle assemblies 28 arranged in opposite sides of the converging section 11 through pipe 23 from the discharge side of the pump 22. The pump in turn receives liquor from the sump 20 in the cyclone separator. A second branch pipe 30 leads from the pipe 23 to the point of use, which in the case of a pulp mill recovery system would be the spray nozzle supplying the incinerating furnace of the heat and chemical recovery unit (not shown). The liquor withdrawn from the sump in the bottom of the cyclone separator and delivered to the spray nozzle of an incinerating furnace will ordinarily have a concentration of the order of 60 to 65% solids, for self-sustaining combustion of the liquor in the incinerating furnace.

When the washing liquor delivered to the throat has a solids content of the order of 60%, the density of the liquor is of the order of 82 lbs. per cubic foot and the viscosity will be about 600 Saybolt Universal seconds at 200° F. Under these conditions with nozzle assemblies 32 of the type illustrated in FIG. 4, satisfactory atomization of the liquor will occur with a gas velocity of 175 ft. per second (or greater) through the throat 12, and 85% to 90% of the dust or fume in the gas delivered to the scrubber-separator unit will be removed with a gas flow pressure drop through the unit of the order of 33 to 35 inches of water pressure.

Substantially the same dust removal efficiency can be obtained when passing the gases through the unit using a spray liquid which has a viscosity equal to that of water. For this condition the gas flow velocity may be greatly reduced with a corresponding reduction in pressure drop to the order of 15 inches of water pressure. However, it is economically desirable to use residual and/or make-up liquor as the spray medium since the heat in the gas will then be utilized to concentrate the liquor and thus save the cost of steam necessary to concentrate the liquor to a solids content usable in the incinerating furnace.

The efficiency of dust or fume removal in the scrubber-separator unit is dependent upon the intimacy of contact between the liquid droplets and the dust or fume particles, and upon the fineness of the liquid droplets available for the gas-liquor contact in the venturi. Since high gas velocities are necessary to atomize the liquid introduced into the venturi, it should be noted that increasing the viscosity of the liquid produces a corresponding increase in the gas pressure drop.

Make-up liquor supplied to the scrubber-separator combination is obtained, in the case of the pulp mill installation, from a multiple effect evaporator where the pulp residual liquor is concentrated to a solids content between 40% and 50%. The amount of liquor used as make-up from the multiple effect evaporators will be dependent upon the rate of liquor withdrawal through the pipe 30 to the incinerating furnace. In accordance with the present invention, the makeup liquor at, for example, a solids concentration of 45% is delivered through a pipe 31 to the nozzle assemblies 32 positioned in the venturi throat downstream, in a gas flow sense, of the nozzle assemblies 28. It will be understood that the higher the viscosity, or the density, of the liquor delivered to the venturi throat, the greater the velocity of gas flow necessary through the throat 12 to attain the desired subdivision of the liquor and wetting of the fine dust particles in the gas.

With the makeup liquor received from the multiple effect evaporators having a solids concentration of 45%, for example, the density of this liquor will be of the order of 75 lbs. per cubic foot at 200° F. While the densities of the 60% solids concentration and 45% solids concentration liquors are not greatly different, i.e., 82 lbs. per cubic foot and 75 lbs. per cubic foot respectively, the viscosity of the two liquors will be of the order of 600 Saybolt Universal seconds and 50 Saybolt Universal seconds, respectively.

Since the effectiveness of gas-liquid contact in the venturi throat is dependent in the main upon the viscosity of the liquid introduced thereto, the lower density make-up liquor may be effectively used in the present invention to accomplish an efficient removal of fume or dust from the gas while at the same time effectively concentrating the liquor by evaporation to a usable value for subsequent use in the incinerating furnace.

It will be understood that the rate of liquor flow to the venturi scrubber will be as much as 10 or more times the rate of liquor flow to the incinerating furnace, in order to attain the necessary degree of dust removal and liquor evaporation for the purpose described. For example, the liquor to gas ratio in the scrubber may be of the order of 20 gal./1,000 cu. ft., whereas the rate of makeup liquor flow to the nozzles 32 may be 2 gal./1,000 cu. ft. While the makeup liquor, i.e., the low viscosity liquor, may be introduced into the scrubber upstream of the nozzle position of the recirculated high viscosity liquor, the preferred arrangement is as shown in the drawings where the nozzle assemblies 32 are downstream of the nozzle assemblies 28. The latter arrangement is preferred to protect the low flow rate nozzles from the plugging effects occasioned by contact with the high temperature entering gases.

The enlarged views of the venturi shown in FIGS. 2 and 3 illustrate a preferred construction. As shown in FIG. 2, the walls 34 and 35 of the inlet portion 11 leading to the throat 12 converge to reduce the dimension of the throat to a value which is but a small fraction of the corresponding dimension of the attached duct 10. As shown in FIG. 3, the side view of the throat illustrates the substantial uniformity in the width of the duct 10, the inlet and outlet portions 11 and 13 respectively, and the venturi throat 12. The nozzle assemblies 28 for introducing the higher density liquor are supplied through headers 36, which receive the liquor from pipe 23. Each header 36 is connected with stub headers 37 by pipes 38 each of which is provided with a flexible connection 40 and a shut-off valve 41. Each of the stub headers 37 is provided with a plurality of equally spaced orifices and a matching nozzle for the discharge of liquor into the scrubber. To assist in the atomization of the high viscosity recirculated liquor, each of the liquor streams in an individual nozzle is provided with an intersecting jet of a highly expansible fluid, such as steam. As shown in FIGS. 3 and 4, the steam passes from a supply pipe 42 through a valved pipe 43 to a steam header 44 attached to an opening to each nozzle.

As shown in FIG. 4, the stub header manifold 37 is mounted directly on the exterior side of the plate 35 (or 34) by brackets 45 with each orifice 46 opening to a hole 46′ drilled and threaded into a bar 47 which is secured to the stub header and bears on the exterior edge portions of an opening A formed in the plate 35. An orifice plug 48 is threaded into the bar 47 with the opening 46 coaxial with the orifice 50 of the plug 48. The bar 47 is drilled to connect the header 44 with the hole 46′ and the plug is also drilled to provide a passageway 51 opening to the orifice 50 so that steam may be admitted into contact with the liquor causing its discharge as a finely atomized mist into the venturi. When steam is used for atomizing purposes, the steam quantity may be approximately 2% by weight of the high viscosity liquor delivered to the scrubber. Good atomization can be obtained by using steam at a pressure in the order of 15 pounds per square inch greater than the liquor pressure in the manifold 37.

The low viscosity liquor passing through the pipe 31 is delivered to manifolds 52, each mounted by brackets 53 on a side wall of the throat 12 downstream, in a gas flow sense, of the nozzle assemblies 28. The manifolds 52 are each provided with a plurality of equally spaced orifice openings 54 in a side thereof, with the row of openings enclosed by bars 55 and 56 which are attached to the manifold and bear upon the edge portions of an opening in the wall of the throat 12. A splash plate 57 is attached to the manifold immediately below the orifice openings 54 and extends in an upwardly inclined direction to the throat in relation to the gas flow path effecting the discharge of flat sheets of liquor from opposite sides of the throat. Preferably, the splash plate is positioned so its forward edge does not project into the path of the gas moving through the throat.

In the structural arrangement shown in FIG. 4, each of the nozzles 28 and 32 are arranged so that they may be removed for cleaning or replacement. In the usual installation, each set of nozzles is arranged in a row with the spacing of the nozzles in the assemblies 28 of the order 2½" while the nozzles in the assemblies 32 are arranged on 4" spacing, so as to obtain adequate and complete distribution of the liquor across the gas flow passageway. Other nozzle spacings may be used on some installations without adverse effect on the operation of the scrubber, provided all portions of the gas stream passing through the venturi are contacted by both high and low viscosity liquor.

While in accordance with the provisions of the statutes I have illustrated and described herein the best form and mode of operation of the invention now known to me, those skilled in the art will understand the changes may be made in the form of the apparatus disclosed without departing from the spirit of the invention covered by my claims, and that certain features of my invention may sometimes be used to advantage without a corresponding use of other features.

What is claimed is:

1. Apparatus for concentrating residual pulp liquor and for scrubbing chemical dust and fume from hot flue gases discharged from a furnace wherein the concentrated liquor is burned, said apparatus comprising a venturi scrubber, a gas and liquid separating means, and means for passing a flue gas from a furnace serially through said scrubber and said separating means, said scrubber including a vertically disposed unobstructed conduit having an inlet portion of gradually diminishing cross-sectional flow area for accelerating said gases, a throat portion of constant cross-sectional flow area, a discharge portion of gradually increasing flow area arranged to effect a substantial regain of pressure of said gases, and spray means for introducing concentrated pulp liquor into the accelerated hot gas stream within said conduit, said separating means being arranged for the separation of liquor from said gas stream and collection of a concentrated liquor, said spray means comprising a first set of nozzles connected to said inlet portion and constructed and arranged to spray said concentrated liquor substantially only transversely into the accelerated gas stream in the vicinity of said throat portion prior to its entering the discharge portion of said conduit, means including pump means for supplying the concentrated liquor from said separating means to said first set of nozzles, means for introducing a highly expansible fluid through said first set of nozzles along with said concentrated liquor to produce a finely divided spray of said concentrated liquor above said throat portion, a source of residual pulp liquor having a viscosity substantially less than that of said concentrated liquor, and means including a second set of nozzles connected to said throat and said source arranged for introducing all of said residual liquor from said source transversely into the accelerated gas at the throat portion of said conduit.

2. Apparatus according to claim 1 wherein means interconnect said furnace and said separating means for discharging a controlled quantity of said concentrated liquor from the separating means to the furnace for burning said liquor.

3. The method of concentrating residual pulp liquor and recovering chemical dust and fume from hot flue gases discharged from a furnace wherein concentrated liquor is burned and from which combustion gases pass through a venturi shaped evaporator-scrubber having converging inlet and diverging outlet portions and an intermediate throat portion and thence to a gas and liquid separating means wherein concentrated liquor is separated and collected, which comprises passing the flue gases into the converging portion, atomizing concentrated liquor from said gas and liquid separating means with a highly expansible gas, introducing the atomized liquor into the converging portion of said evaporator-scrubber at a rate substantially greater than the rate of combustion of said concentrated liquor in the furnace to cause its discharge as a finely atomized mist into intimate contact with the flue gases, and spraying a relatively low concentration make-up liquor transversely of the flue gases in the throat portion in contact therewith and at a rate substantially compensating for the rate of concentrated liquor combustion.

4. In a method according to claim 3, wherein the higher concentrated liquor is recirculated a rate of the order of 10 times the normal rate of delivery of the relatively low concentration make-up liquor.

5. In a method according to claim 3 wherein the concentrated liquor has a viscosity of the order 600 Saybolt Universal seconds and the viscosity of the relatively low concentration make-up liquor is of the order of 50 Saybolt Universal seconds.

References Cited by the Examiner

UNITED STATES PATENTS

| | | | |
|---|---|---|---|
| 2,590,905 | 4/52 | Tomlinson et al. | 159—4 |
| 2,604,185 | 7/52 | Johnstone et al. | 55—237 |
| 2,621,754 | 12/52 | Doyle. | |
| 2,797,904 | 7/57 | Voorheis | 261—118 |
| 2,829,710 | 4/58 | Paasch | 159—4 |
| 2,871,973 | 2/59 | Roujob | 261—118 X |
| 2,879,838 | 3/59 | Flynt et al. | 159—47 |
| 2,895,335 | 7/59 | Kraftson et al. | 73—421.5 |
| 2,935,375 | 5/60 | Boucher | 55—257 X |
| 2,987,921 | 6/61 | Kraftson | 73—421.5 |
| 3,009,687 | 11/61 | Hendriks | 261—118 X |

FOREIGN PATENTS

| | | |
|---|---|---|
| 809,378 | 2/59 | Great Britain. |

REUBEN FRIEDMAN, *Primary Examiner.*

HERBERT L. MARTIN, *Examiner.*